May 16, 1933.  W. GUMPRICH  1,909,580
WEIGHING SCALE
Filed July 23, 1930   2 Sheets-Sheet 1
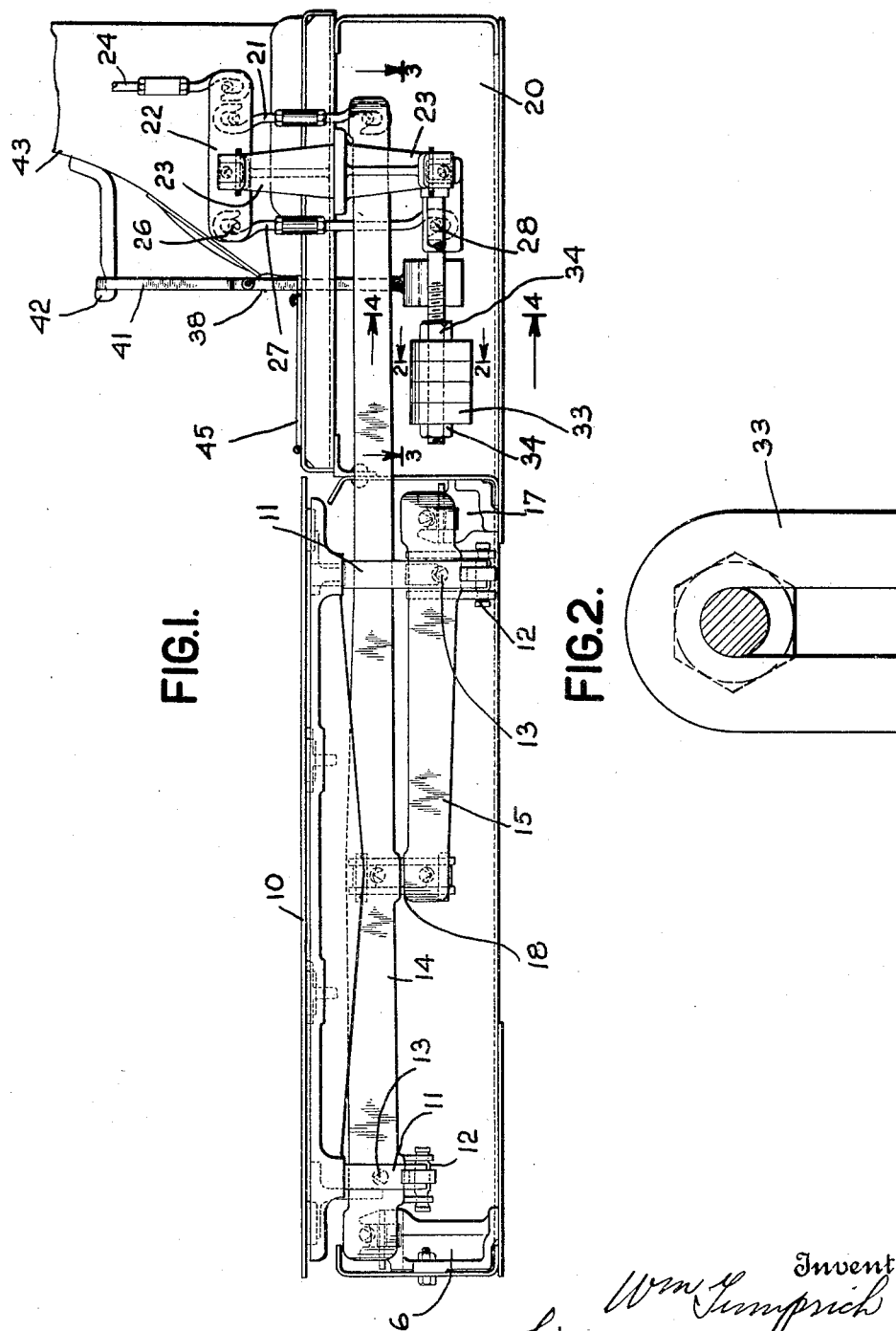

May 16, 1933. W. GUMPRICH 1,909,580
WEIGHING SCALE
Filed July 23, 1930 2 Sheets-Sheet 2
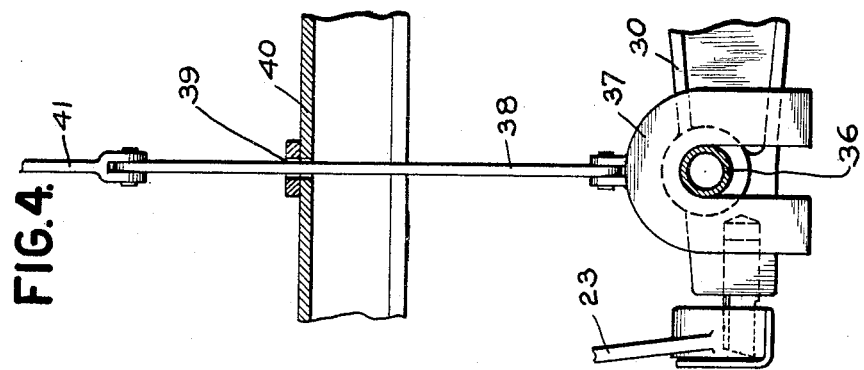
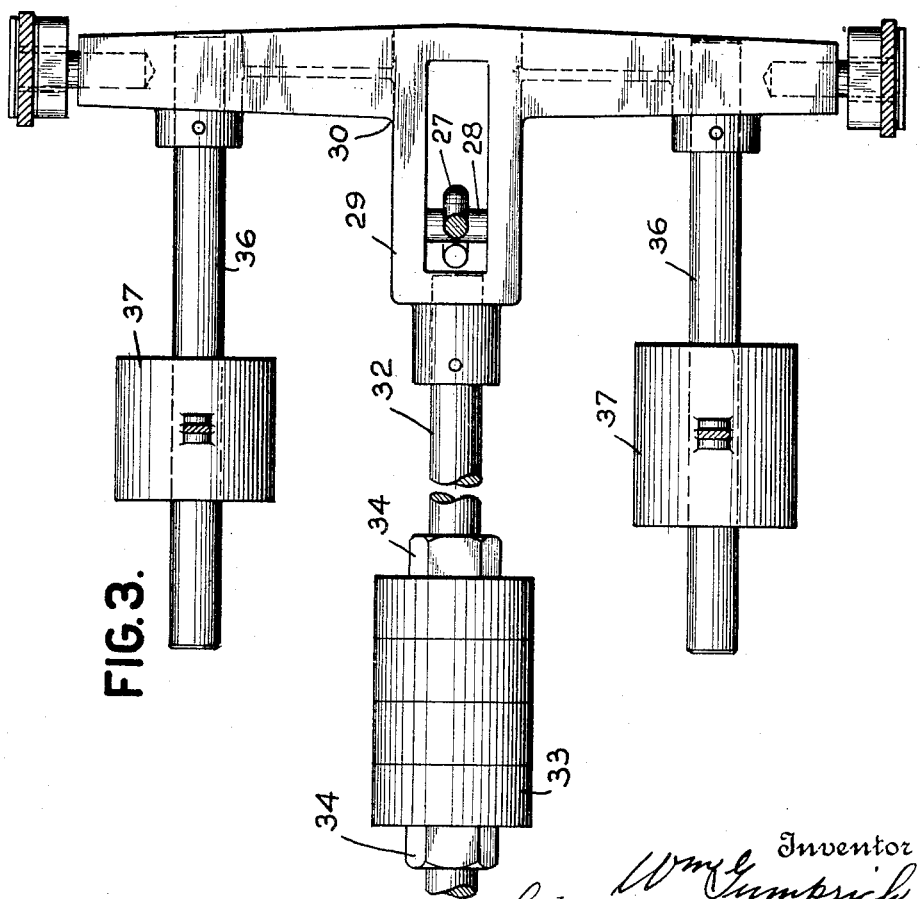

Patented May 16, 1933

1,909,580

UNITED STATES PATENT OFFICE

WILLIAM GUMPRICH, OF BINGHAMTON, NEW YORK, ASSIGNOR TO DAYTON SCALE COMPANY, OF DAYTON, OHIO, A CORPORATION OF NEW JERSEY

WEIGHING SCALE

Application filed July 23, 1930. Serial No. 470,052.

This case relates to weighing scales and particularly to the lever systems thereof of the type in which back weighting means are provided to neutralize the initial weights of the platform and related scale elements.

The object of the invention is to provide a back weighting means of a novel construction.

More specifically the object is to provide a back weighting means which is connected to an intermediate lever located between the base lever system and the counterbalancing system.

Another object of the invention is to provide novel means for offsetting tares of containers placed on the platform.

More specifically the latter object is to provide such tare offsetting means in connection with a back weighting lever.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a side section through the lower part of the weighing scale.

Fig. 2 is a section on line 2—2 of Fig. 1.

Fig. 3 is a section on line 3—3 of Fig. 1.

Fig. 4 is a section along line 4—4 of Fig. 1.

Referring to the drawings in detail, the platform 10 has downwardly extending legs 11 provided with universal pivots 12 bearing on the knife edges 13 of main lever 14 and auxiliary lever 15. The lever 14 is of usual third order fulcrumed on a standard 16 while the auxiliary lever is also of the third order fulcrumed on a standard 17. The levers 14 and 15 are connected by links 18. Lever 14 extends beyond the platform 10 into the housing 20 and has a link connection 21 to an intermediate lever 22 fulcrumed on a standard 23. The inner end of lever 22 is connected to the draft rod 24 extending to any suitable counterbalancing system. Opposite to that end of intermediate lever 22 connected to draft rod 24 is a bearing 26 from which is suspended a link 27 the lower end of which is engaged by a knife edge 28 carried by and between the walls of a rectangular central portion 29 of back weighting lever 30. The lever 30 is fulcrumed at one end on the standard 23 and is provided with three arms extending in the same direction as levers 14, 15 and 22. The central arm 32 consists of a round rod threaded at its terminal portion and on which drop weights 33 are secured between nuts 34 threaded on said arm 32. The lever 30 may thus be adjusted to seal the scale to zero initially. The arms 36 on each side of arm 32 consists of round rods adapted to receive drop weights 37. Each drop weight 37 is connected at its upper end to a link 38 passing through and guided by a hole 39 in the top of the casing 40. The upper end of each link 38 is pivotally connected to another link 41 the upper end of which is engageable with a hook 42 secured to the scale housing 43. Each drop weight 37 is designed to compensate a different weight container to be placed on the platform 10. Initially both drop weights 37 are free of the arms 36 of the back weighting lever, the links 41 being held by the hooks 42.

Assuming that the operator places a load on the platform 10 in a container such as a wheelbarrow and that the latter weighs the same as the drop weight 37 at the right hand side of the scale, as viewed from the front of the scale. After placing the wheelbarrow with the load on the platform 10, the operator unhooks right hand link 41 from its hook 42 thus permitting the connected weight 37 to drop on the right hand arm 36. The additional weight on the arm 36 rotates the lever 30 counterclockwise as viewed in Fig. 1 thereby also rotating intermediate lever 22 counterclockwise and raising the draft rod 24. This compensates for the weight of the wheelbarrow on the platform which tends to effect downward movement of rod 24 through the levers 13 and 14 and link 21 connected to intermediate lever 22.

After the weighing operation, the operator replaces the link 41 on the hook 42, the pivotal connection between links 41 and 38 permitting the link 38 to be guided for vertical movement in the slot 39 of housing 40 while freely permitting the swinging of the link 41 into and out of engagement with hook 42. Similarly, if the load container is of the same weight as the left hand drop weight 37, the operator releases the left hand link 41 from the hook 42 thereby placing the left hand drop weight 37 in operative position on the lever 30.

In order to provide for convenient assembly and disassembly of the weights 33 on the central arm 32 of the back weight lever a door 45 is hinged to the top 40 of the scale housing. When the door 45 is swung open, free access may be had to the weights 33.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In a weighing scale, a base lever system, a platform supported by the base lever system, an intermediate lever above the base lever system and platform, a draft rod extending upwardly from one arm of said intermediate lever, a link connection between the base lever system and the aforesaid arm of the intermediate lever, a third order back-weighting lever below the plane of the platform, gravity means preliminarily adjusted in position on said third order lever to seal the scale, and a link connection from the third order lever to the arm of the intermediate lever opposite the first-mentioned arm, said third order lever and base lever system extending substantially in the same direction.

2. A weighing scale having a base lever system, a sealing lever associated therewith including a threaded arm, weights removably carried thereby, and elements threaded on said arm for clamping said weights therebetween.

3. A scale such as described in claim 2, and a housing for the sealing lever including a hinged door through which access is had to said weights.

4. A scale having a load support, a base lever system connected thereto, a lever separate therefrom but associated therewith including an arm for carrying a drop weight to counteract a predetermined load on said support, and means for at will engaging and disengaging the drop weight from said arm, said last-named means including links connected to the drop weight and a hook for releasably holding the links in a position to remove the drop weight from said arm.

5. A scale having a load support, a base lever system connected thereto, a lever separate therefrom but associated therewith including an arm for carrying a drop weight to counteract a predetermined load on said support, and means for at will engaging and disengaging the drop weight from said arm, there being a plurality of drop weights of different capacities to compensate predetermined loads equal to tares of different containers.

6. A scale having a load support, a base lever system connected thereto, a lever separate therefrom but associated therewith including an arm for carrying a drop weight to counteract a predetermined load on said support, and means for at will engaging and disengaging the drop weight from said arm, there being a plurality of such arms, and a plurality of drop weights of different capacities for engagement with the several arms.

7. A scale having a load support, a base lever system connected thereto, a lever separate therefrom but associated therewith including an arm for carrying a drop weight to counteract a predetermined load on said support, and means for at will engaging and disengaging the drop weight from said arm, wherein a base housing is provided; said last-named means including a link connected to the drop weight passing through and guided vertically by an aperture in the top of the scale base housing.

8. A scale having a load support, a base lever system connected thereto, a lever separate therefrom but associated therewith including an arm for carrying a drop weight to counteract a predetermined load on said support, and means for at will engaging and disengaging the drop weight from said arm, said last-named means including a pair of links pivotally connected to each other, one of which is connected to the drop weight and the other of which terminates in a hook portion, and a fixed hook for engaging the hook portion.

In testimony whereof I hereto affix my signature.

WM. GUMPRICH.